Figure 1:
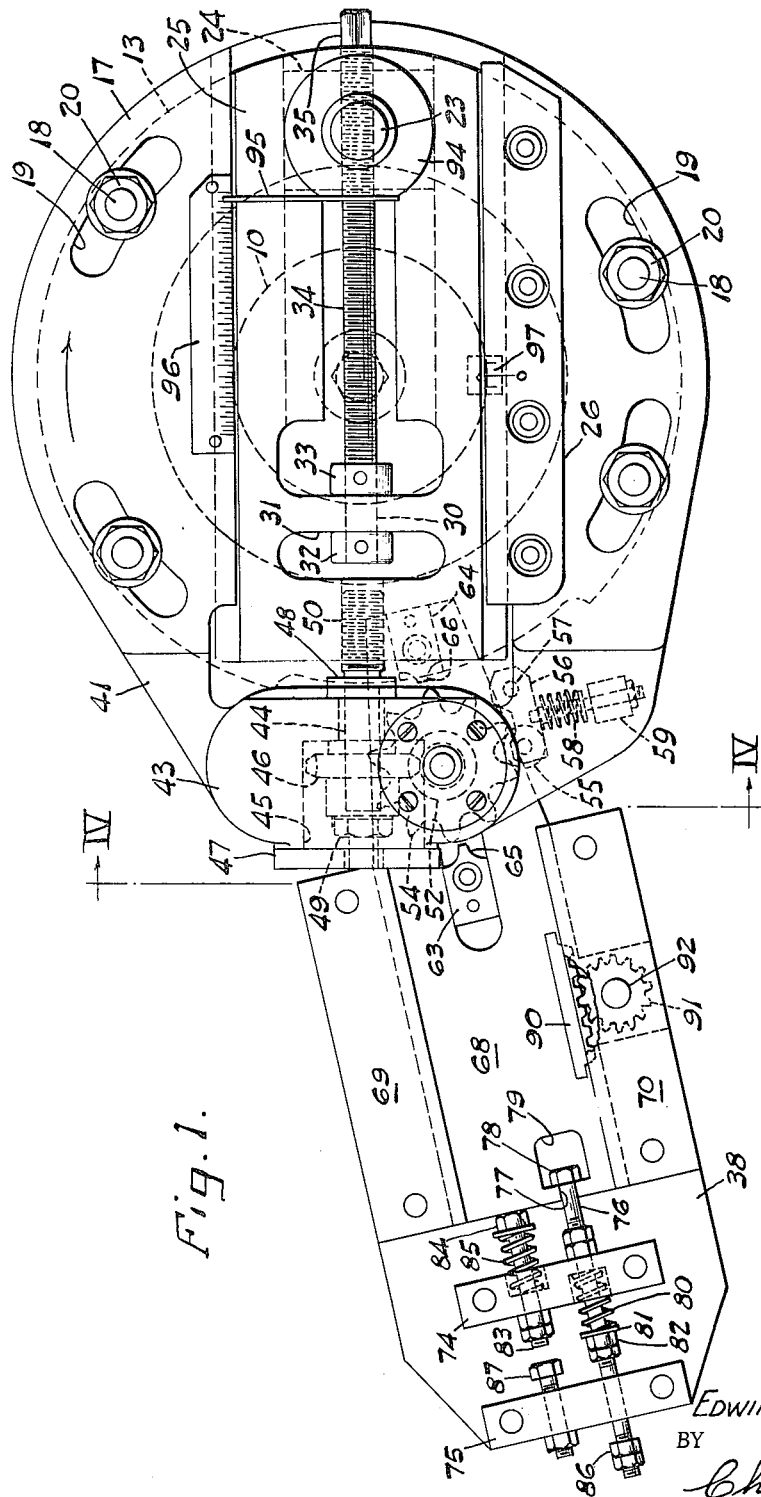

March 29, 1966 E. A. MUNSCHAUER, JR 3,242,768
ADJUSTABLE CRANK MECHANISM
Filed June 11, 1964 3 Sheets-Sheet 1

INVENTOR.
EDWIN A. MUNSCHAUER, JR.
BY
Christel + Bean
ATTORNEYS

March 29, 1966  E. A. MUNSCHAUER, JR  3,242,768
ADJUSTABLE CRANK MECHANISM
Filed June 11, 1964  3 Sheets-Sheet 3

INVENTOR.
EDWIN A. MUNSCHAUER, JR.
BY
Christel & Bean
ATTORNEYS

United States Patent Office 3,242,768
Patented Mar. 29, 1966

3,242,768
ADJUSTABLE CRANK MECHANISM
Edwin A. Munschauer, Jr., Snyder, N.Y., assignor to Niagara Machine & Tool Works, Buffalo, N.Y.
Filed June 11, 1964, Ser. No. 374,485
8 Claims. (Cl. 74—600)

This invention relates to feed mechanism for feeding metal or other material in continuous strip form to power presses and, more praticularly, to means for adjusting the length of strip fed to such machines. More particularly, the invention relates to an adjustable crank mechanism for driving strip feed mechanisms such as roll feeds, slide feeds, or other devices.

The present invention relates to a novel adjustable crank mechanism characterized particularly by the fact that the throw of the crank member may be readily adjusted while the same is in motion. The crank mechanism of the present invention is discussed herein primarily in conjunction with power press operation and strip feed mechanism which is commonly used in connection with power presses and similar reciprocating machines. However, the mechanism of the present invention may have various applications and may be employed wherever an adjustable throw crank mechanism is required, and where the ability to adjust the throw of the crank while the crank mechanism is in motion is of advantage.

In the form of the present invention which is disclosed herein by way of example the crank pin or analogous revolving member is mounted for adjustment along a radius extending from the axis of the shaft from which the crank is driven and means are provided whereby, under manual control and selection, the rotation of the shaft which drives the crank is availed of to move the adjusting mechanism to shift the axis of the crank pin with respect to the axis of the driving shaft to shorten or lengthen the crank throw at will.

Typical embodiments of power press strip feed mechanisms are disclosed in United States Letters Patent No. 1,858,403, dated May 17, 1932, and No. 1,947,015, dated February 13, 1934. In each of these prior patented structures the strip feed mechanism is driven by a reciprocating rack bar and the stroke of reciprocation of the rack bar determines the length of stock fed by the feed mechanism at each stroke of the power press or analogous machine. In each of these prior patents the rack bar is reciprocated by pivotal connection to a crank pin driven from the main shaft of the press, and in each case means are provided for adjusting the throw of the crank pin by adjusting the distance of its axis from the axis of the main shaft. This is conventionally effected as illustrated in the aforesaid patents by a mechanical adjustment which must be made with the machine at rest.

In other types of strip feeding apparatus the crank pin of the present mechanism may be provided with a pitman which has rigid connection to a bell crank operated roll feed or to a slide feed such as is disclosed in United States Letters Patent No. 2,991,751, dated July 11, 1961.

An important disadvantage of the various conventional methods of adjusting the throw of the actuating crank pin of a feed mechanism is that the adjustment must be made while the press is at rest. No matter how precisely this adjustment is made the feed length can not be accurately predetermined due to varying inertia and frictional forces which are present while the press is in motion. Furthermore, these forces cause a change in feed length as the press speed is varied. A principal feature of the present invention comprises the provision of means whereby small corrective adjustments of the feeding length may be accurately effected while the machine with which the mechanism is associated is in normal operation.

While a single specific embodiment of the principles of the present invention is illustrated in the accompanying drawings and described in detail in the following specification, it is to be understood that such embodiment is by way of example only and that various mechanical modifications may be made without departing from the spirit of the invention, the scope of which is limited only as defined in the appended claims.

Figure 2:
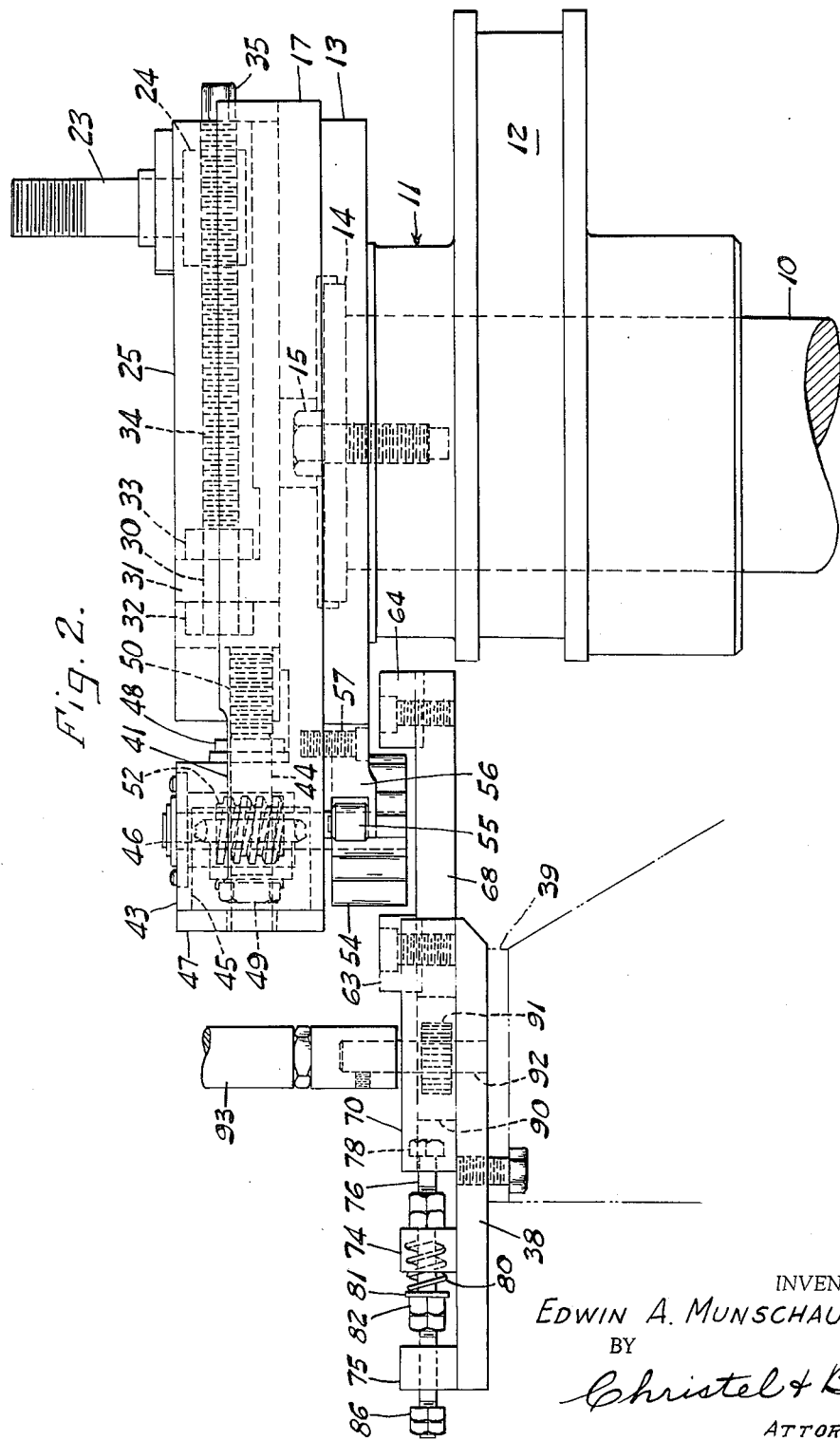
Figure 3:
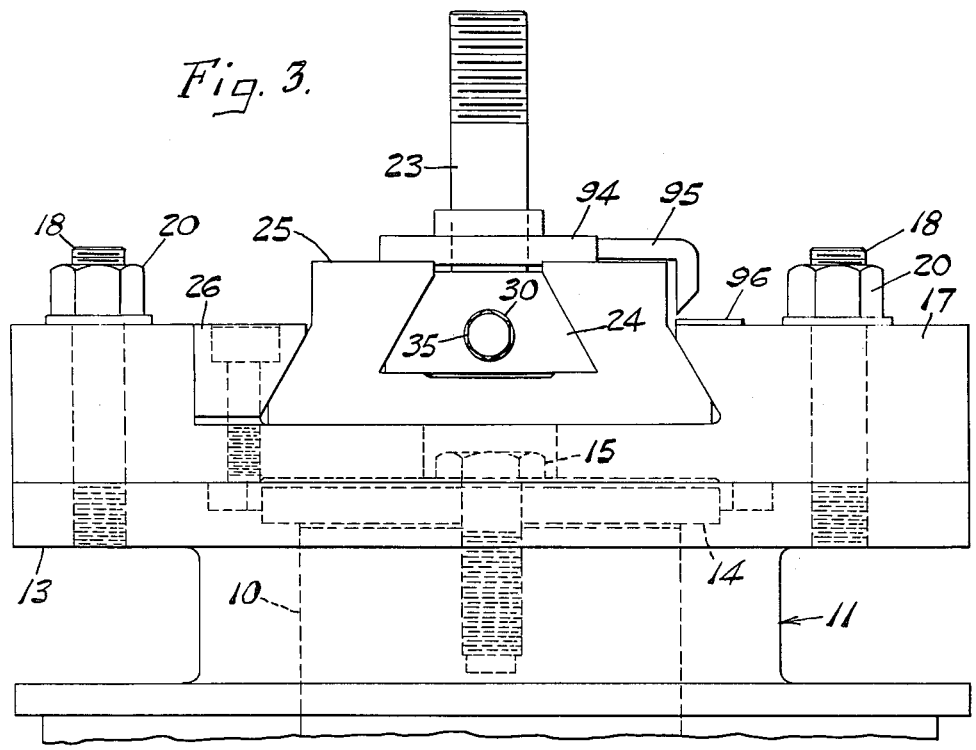
Figure 4:
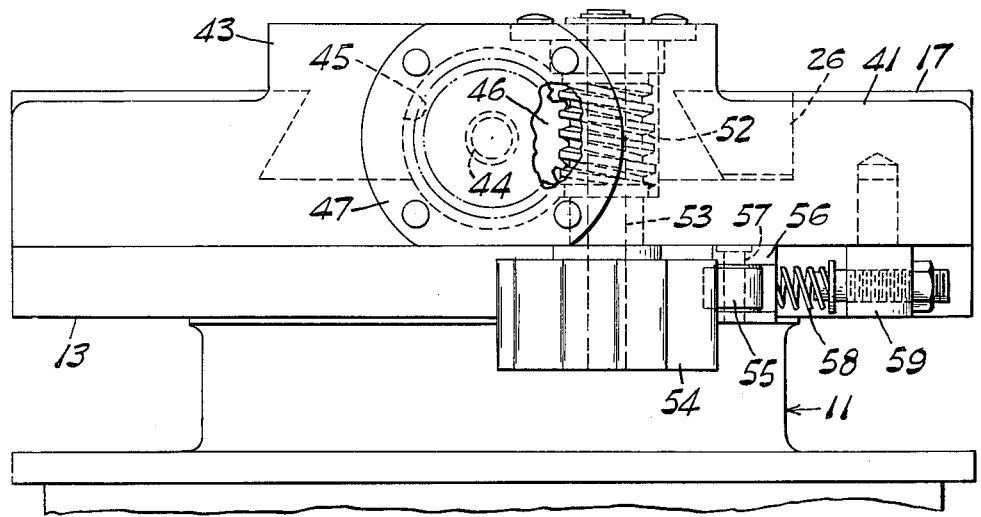

In the drawings:
FIG. 1 is a side elevational view of one form of the feed stroke adjusting mechanism of the present invention;
FIG. 2 is a bottom plan view of the structure of FIG. 1;
FIG. 3 is an elevational view of the structure of FIGS. 1 and 2 viewed from the right hand side of FIG. 1; and
FIG. 4 is an elevational view of a portion of the mechanism of FIG. 1 viewed from the left hand side approximately as indicated by the line IV—IV of FIG. 1.

Like characters of references denote like parts throughout the several figures of the drawings and, referring particularly to FIG. 2, the numeral 10 designates the main crank or eccentric shaft of a power press, from which feed mechanisms are conventionally driven.

As indicated above, FIG. 2 is a bottom plan view and shows the mechanism of the present invention applied to the left-hand end of main shaft 10 of the press. A driving hub 11 is attached and keyed to the end of shaft 10 and may include an eccentric formation 12 for reciprocation of a conventional scrap cutter. At its outer end driving hub 11 is provided with a circular plate or flange formation 13. A retaining plate 14 seats in a recess in the outer end of driving hub 11 and a screw 15 threaded into the end of main shaft 10 retains driving hub 11 fixedly on the end of shaft 10.

A generally circular block 17 is attached to the outer face of flange 13 in such manner as to be angularly adjustable thereon with respect to the axis of shaft 10. Plate 13 carries a series of circumferentially spaced studs 18 which project through arcuate slots 19 in block 17 as clearly shown in FIG. 1 and cooperating nuts 20 secure the block 17 in desired angular position with respect to plate 13 and main shaft 10. This adjustment is provided for the purpose of varying the timing of the operation of the roll feed or slide feed with respect to the operation of the power press proper.

In the drawings the numeral 23 designates a crank pin the rotation of which reciprocates the feed mechanism. The throw of crank pin 23 determines the length of the stroke of the feed mechanism at each cycle of operation, thus determining the length of the strip of stock which is fed at each cycle of press operation. As indicated earlier herein, a primary object of the present invention is to provide means whereby the length of stock fed at each cycle may be precisely adjusted while the machine is in motion. In the form of the invention illustrated herein by way of example, the base of crank pin 23 comprises a dovetail block 24 which is slidable in a complementary dovetail groove in a slide block 25.

Slide block 25 is likewise externally of dovetail form and is slidable in block 17 as clearly shown in FIG. 3. An adjustable gib 26 is provided for cooperation with block 17 to provide a dovetail groove in which slide block 25 slides in the same direction as the sliding movement of dovetail block 24 in slide block 25.

A coarse main adjustment of the position of crank pin 23 with respect to the axis of main shaft 10 (which determines the throw of the crank pin) is effected by movement of the dovetail formation 24 of crank pin 23 in slide block 25. A more precise corrective adjustment of the throw of the crank pin is effected by final adjusting movement of slide block 25 in block 17, the latter adjustment being attainable while the power press is in operation as will presently appear. To provide for the aforesaid coarse adjustment a screw shaft 30 is journaled at one end in a bearing formation 31 in slide block 25 and collars 32 and 33 prevent relative endwise movement of screw shaft 30. The major portion of screw shaft 30 is threaded as at 34 and extends through complementary internal threads in dovetail block 24 of crank pin 23. The right-hand end of the threaded shaft 30 is provided with a wrench formation 35 whereby the relative position of dovetail portion 24 of crank pin 23 along the slide block 25 may readily be adjusted to attain the aforesaid coarse adjustment of the degree of throw of crank pin 23.

Reference will now be had to the means for adjusting slide block 25 relative to block 17 while the power press and the feed roll mechanism are in motion. A support plate 38 which carries certain relatively stationary portions of the in-motion adjusting mechanism is attached to a portion of the general framework of the power press indicated at 39 in FIG. 2. Block 17 which is attached to and rotatable with main shaft 10 through driving hub 11 and mounting flange 13 has previously been described as of generally circular form. Block 17 includes a radially extending portion 41 which is shown in FIG. 1 and which carries a further portion of the in-motion adjusting mechanism.

Reference will first be had to the portion of the in-motion adjustment mechanism which is carried by the extension 41 of circular block 17 and in this connection reference will be had particularly to FIGS. 1 and 4. An enlargement 43 of extension 41 provides bearing support for an adjustment shaft 44 and includes a chamber portion 45 which houses a worm wheel 46 fixed to adjustment shaft 44. Shaft 44 also has bearing in a cover plate 47 and a collar 48 and a retaining nut 49 prevent relative axial movement of shaft 44. The right-hand end of shaft 44 is threaded as at 50 to engage a complementary threaded opening in the left-hand portion of slide block 25 as viewed in FIG. 1.

As shown best in FIG. 4, a worm 52 which meshes with worm wheel 46 is journaled in the enlargement 43 of extension 41 of block 17 and has a downwardly extending shaft portion 53 which has fixed thereto a star wheel 54. A detent roller 55 normally occupies a space between projections of star wheel 54. Detent roller 55 is rotatably carried by an arm 56 which is pivoted to extension 41 as at 57. A compression coil spring 58 acts between an adjustable abutment 59 and arm 56 to urge detent roller 55 toward star wheel 54.

From the foregoing it will be seen that rotation of star wheel 54 in one direction or the other will rotate adjustment shaft 44 through the worm and wheel connection and, through the medium of threaded portion 50 of shaft 44, will provide a micrometer adjustment of slide block 25 with respect to circular block 17 in a direction at right angles to the axis of the shaft 10, thus adjusting the radius of throw of crank pin 23.

It will be noted that star wheel 54 revolves about the center of shaft 10 as block 17 and extension 41 thereof rotate with shaft 10. In moving about this circle of revolution star wheel 54 passes between a pair of blocks 63 and 64, having tooth formations designated 65 and 66, respectively, which project toward the periphery of star wheel 54 at opposite sides thereof as shown in FIG. 1. Blocks 63 and 64 are fixed to a plate 68 which is slidably mounted on support plate 38. The side edges of plate 68 are tapered and a pair of complementarily tapered retaining bars 69 and 70 which are screwed to support plate 38 form a dovetail joint which mounts plate 68 for sliding movement in a direction which lies along a radius of shaft 10.

Means are provided for normally maintaining plate 68 in the neutral intermediate position illustrated in FIG. 1 wherein the tooth formations 65 and 66 of blocks 63 and 64 are adjacent to but outside of the path of revolution of the teeth of star wheel 54. A pair of blocks 74 and 75 are fixed to the surface of support plate 38 as shown in FIG. 1. A screw 76 which extends through the block 74 is disposed in a slot 77 in plate 68 in such manner that the head 78 thereof engages the wall of a recess 79 formed in plate 68. A coil spring 80 which is disposed about screw 76 extends into a recess in block 74 and is retained on screw 76 by a washer 81 and a nut 82. Thus spring 80 urges plate 68 to the left as viewed in FIG. 1.

A second screw 83 passes through block 74 and its head 84 is in abutment with the end of plate 68. A coil spring 85 disposed about screw 83 extends into a recess in block 74 and is retained by head 84 of screw 83. Coil spring 85 urges plate 68 to the right as viewed in FIG. 1 in opposition to the urge of the previously described coil spring 80.

From this it will be seen that the coil springs 80 and 85 act against plate 68 in opposite directions and maintain the latter in its illustrated neutral position. Screw 76 extends to the left as viewed in FIG. 1 through block 75 and a nut 86 at the left hand end of screw 76 is adjusted so that, upon movement of plate 68 to the right against the resistance of spring 80, nut 86 will engage against block 75 and thus limit movement to the right of plate 68. Movement of plate 68 to the left as viewed in FIG. 1 is limited by the engagement of the left-hand end of screw 83 against the head of a screw 87 which is adjustably threaded into block 75.

Movement of plate 68 either to the left or to the right as viewed in FIG. 1 within the limits established by the setting of screw 87 and nut 86 as described in the foregoing is accomplished through a rack bar 90 fixed to plate 68 and a meshing pinion 91 whose mounting shaft 92 is journaled in support plate 38. As indicated in FIG. 2, a flexible shaft 93 is attached to the shaft 92 of pinion 91 and flexible shaft 93 leads to a convenient location on the machine proper where it is rotated by means of a hand wheel. Thus the plate 68 may be moved to either of its end limit positions from the resiliently maintained neutral position illustrated in FIG. 1.

As indicated earlier herein, a coarse general adjustment of the radius of throw of crank pin 23 will usually first be established by rotation of the screw 30 with the press at rest to establish a predetermined relative position of the crank pin 23 with respect to slide block 25. After the press is in operation and it is desired to precisely adjust the length of strip being fed or correct for misadjustment during operation of the press, an operator moves the aforesaid hand wheel in one direction or the other to rotate flexible shaft 93 and thereby, through rack 90 and pinion 91, move slide plate 68 to project either the tooth projection 65 or the tooth projection 66 into the path traversed by the teeth of star wheel 54 as the latter revolves about the axis of shaft 10. Assuming that movement of plate 68 is to the right as viewed in FIG. 1, toothed projection 65 will be moved so that upon clockwise rotation of shaft 10 as viewed in FIG. 1 a tooth of star wheel 54 will engage upwardly against projection 65 which will cause star wheel 54 to rotate partially in a counterclockwise direction. The amount of movement thus imparted to the star wheel by this tooth engagement is something more than one-half the pitch of the teeth of the star wheel but substantially less than one full pitch. Accordingly, at the instant that movement of the star wheel due to direct tooth contact is complete, the star wheel will be moved an additional amount by the resilient tendency of detent wheel 55 to move into the next adjacent space between teeth, thus assuring that each revolution of the main shaft of the press will produce an angular movement of star wheel 54 equal to one tooth pitch. This is particularly important since, upon adjustment in a reverse direction when tooth projection 66 is in interfering position with respect to the teeth of the star wheel, the same one tooth movement of the star wheel will be effected even though the movement resulting from direct tooth impingement will be slightly less due to the lesser radius of the position of engagement with respect to the axis of main shaft 10.

Thus as long as an operator holds the hand wheel in one position or another to maintain one of the projecting teeth 65 or 66 in the path of star wheel 54 against the tendency of springs 80 and 83 to maintain a neutral position of the teeth, the star wheel will be rotated one tooth pitch for every complete rotation of main shaft 10. This produces a step by step micrometric adjustment of position of slide block 25 with respect to block 17 through the adjusting operation of screw shaft 44. Thus the throw of crank pin 23 may be precisely adjusted to secure a desired length of strip feed for each cycle of operation of the press with which the feed mechanism is associated. This incremental adjustment will continue as long as the operator holds the handwheel in one direction or the other but will cease as soon as the handwheel is released.

As will be clearly understood by those skilled in this art, a rack or a pitman or connecting rod end or bearing, which may be either spherical or cylindrical, will be secured to crank pin 23 by a nut. The nut clamps the rod end or bearing against a washer or collar 94 which in the present instance pulls up on the dovetail mounting portion 24 and secures it to slide block 25. Collar 94 on crank pin 23 carries a pointer 95 which cooperates with a scale 96 fixed to block 17 to measure the eccentric setting of the crank pin as determined jointly by the position of slide block 25 relative to block 17 and the position of crank pin block 24 relative to slide block 25. Graduations 97 on gib 26 cooperate with a marking on slide block 25 to indicate the position of slide block 25 relative to block 17.

I claim:

1. In a crank drive mechanism including a rotatable drive shaft and an eccentrically disposed crank pin carried thereby, means for adjusting the eccentricity of the crank pin while the latter is being revolved by rotation of the drive shaft, a support carried by said drive shaft, crank pin mounting means carried by said support and movable radially with respect to the axis of said drive shaft, an adjusting wheel rotatably mounted on said support eccentrically with respect to said drive shaft axis for revolution thereabout during drive shaft rotation, a driving connection between said adjusting wheel and said crank pin mounting means for radial adjustment of the latter upon rotation of the former, a relatively stationary support adjacent to said drive shaft carried support and means on said stationary support selectively movable radially toward and away from the drive shaft axis, and a pair of spaced wheel engaging members on said radially movable means adapted in intermediate position of the latter to lie at opposite sides of the path of revolution of said wheel, whereby movement of said radially movable means in either direction disposes one of said engaging members in wheel-engaging position to rotate the latter in one direction or the other a predetermined increment as the latter revolves past the engaging member.

2. In a crank drive mechanism including a rotatable drive shaft and an eccentrically disposed crank pin carried thereby, means for adjusting the eccentricity of the crank pin while the latter is being revolved by rotation of the drive shaft, a support carried by said drive shaft, crank pin mounting means carried by said support and movable radially with respect to the axis of said drive shaft, an adjusting wheel rotatably mounted on said support eccentrically with respect to said drive shaft axis for revolution thereabout during drive shaft rotation, a driving connection between said adjusting wheel and said crank pin mounting means for radial adjustment of the latter upon rotation of the former, a relatively stationary support adjacent to said drive shaft carried support and means on said stationary support selectively movable radially toward and away from the drive shaft axis, a pair of spaced wheel engaging members on said radially movable means adapted in intermediate position of the latter to lie at opposite sides of the path of revolution of said wheel, whereby movement of said radially movable means in either direction disposes one of said engaging members in wheel-engaging position to rotate the latter in one direction or the other a predetermined increment as the latter revolves past the engaging member, and a slide adjustment between said crank pin and said crank pin mounting means for adjusting the crank pin relative to the mounting means in a radial direction with respect to the drive shaft axis for establishing a preliminary rough adjustment of the eccentricity of the crank pin while the mechanism is at rest.

3. In a crank drive mechanism including a rotatable drive shaft and an eccentrically disposed crank pin carried thereby, means for adjusting the eccentricity of the crank pin while the latter is being revolved by rotation of the drive shaft, a support carried by said drive shaft, crank pin mounting means carried by said support and movable radially with respect to the axis of said drive shaft, a toothed wheel rotatably mounted on said support eccentrically with respect to said drive shaft axis for revolution thereabout during drive shaft rotation, a driving connection between said toothed wheel and said crank pin mounting means for radial adjustment of the latter upon rotation of the former, a relatively stationary support adjacent to said drive shaft carried support and means on said stationary support selectively movable radially toward and away from the drive shaft axis, and a pair of spaced abutments on said radially movable means adapted in intermediate position of the latter to lie at opposite sides of the path of revolution of said toothed wheel, whereby movement of said radially movable means in either direction disposes one of said abutments in the path of the teeth of said toothed wheel to rotate the latter in one direction or the other a predetermined increment by engagement of the abutment against a tooth of said toothed wheel as the latter revolves past the abutment.

4. In a crank drive mechanism including a rotatable drive shaft and an eccentrically disposed crank pin carried thereby, means for adjusting the eccentricity of the crank pin while the latter is being revolved by rotation of the drive shaft, a support carried by said drive shaft, crank pin mounting means carried by said support and movable radially with respect to the axis of said drive shaft, a toothed wheel rotatably mounted on said support eccentrically with respect to said drive shaft axis for revolution thereabout during drive shaft rotation, a driving connection between said toothed wheel and said crank pin mounting means for radial adjustment of the latter upon rotation of the former, a relatively stationary support adjacent to said drive shaft carried support and means on said stationary support selectively movable radially toward and away from the drive shaft axis, a pair of spaced abutments on said radially movable means adapted in intermediate position of the latter to lie at opposite sides of the path of revolution of said toothed wheel, whereby movement of said radially movable means in either direction disposes one of said abutments in the path of the teeth of said toothed wheel to rotate the latter in one direction or the other a predetermined increment by engagement of the abutment against a tooth of said toothed wheel as the latter revolves past the abutment, and a slide adjustment between said crank pin and said crank pin mounting means for adjusting the crank pin relative to the mounting means in a radial direction with respect to the drive shaft axis for establishing a preliminary rough adjustment of the eccentricity of the crank pin while the mechanism is at rest.

5. In a crank mechanism including a rotatable drive member and eccentrically disposed crank means carried thereby, means for adjusting the eccentricity of the crank means while the latter is being revolved by rotation of the drive member, a support carried by said drive means, crank mounting means carried by said support and movable radially with respect to the axis of said drive member, a toothed wheel rotatably mounted on said support eccentrically with respect to said drive member axis for revolution thereabout during drive member rotation, a driving connection between said toothed wheel and said crank mounting means for radial adjustment of the latter upon rotation of the former, a relatively stationary support and means on said stationary support selectively movable radially toward and away from the drive shaft axis, and a pair of spaced abutments on said radially movable means adapted in intermediate position of the latter to lie at opposite sides of the path of revolution of said toothed wheel, whereby movement of said radially movable means in either direction disposes one of said abutments in the path of the teeth of said toothed wheel to rotate the latter in one direction or the other a predetermined increment by engagement of the abutment against a tooth of said toothed wheel as the latter revolves past the abutment to thereby adjust said crank mounting means radially a corresponding increment.

6. In a crank mechanism including a rotatable drive member and eccentrically disposed crank means carried thereby, means for adjusting the eccentricity of the crank means while the latter is being revovled by rotation of the drive member, a support carried by said drive means, crank mounting means carried by said support and movable radially with respect to the axis of said drive member, an adjusting wheel rotatably mounted on said support eccentrically with respect to said drive member axis for revolution thereabout during drive member rotation, a driving connection between said adjusting wheel and said crank mounting means for radial adjustment of the latter upon rotation of the former, a relatively stationary support and means on said stationary support selectively movable radially toward and away from the drive shaft axis, and a pair of spaced wheel engaging members on said radially movable means adapted in intermediate position of the latter to lie at opposite sides of the path of revolution of said wheel, whereby movement of said radially movable means in either direction disposes one of said engaging members in wheel-engaging position to rotate the latter in one direction or the other a predetermined increment as the latter revolves past the engaging member to thereby adjust said crank mounting means radially a corresponding increment.

7. In a crank mechanism including a rotatable drive member and eccentrically disposed crank means carried thereby, means for adjusting the eccentricity of the crank means while the latter is being revolved by rotation of the drive member, a support carried by said drive means, crank mounting means carried by said support and movable radially with respect to the the axis of said drive member, a toothed wheel rotatably mounted on said support eccentrically with respect to said drive member axis for revolution thereabout during drive member rotation, a driving connection between said toothed wheel and said crank mounting means for radial adjustment of the latter upon rotation of the former, a relatively stationary support and means on said stationary support selectively movable radially toward and away from the drive shaft axis, a pair of spaced abutments on said radially movable means adapted in intermediate position of the latter to lie at opposite sides of the path of revolution of said toothed wheel, whereby movement of said radially movable means in either direction disposes one of said abutments in the path of the teeth of said toothed wheel to rotate the latter in one direction or the other a predetermined increment by engagement of the abutment against a tooth of said toothed wheel as the latter revolves past the abutment to thereby adjust said crank mounting means radially a corresponding increment, and a second radial adjustment comprising a slide connection between said crank means and said crank mounting means for establishing a preliminary radial adjustment of said crank means while the mechanism is at rest.

8. In a crank mechanism including a rotatable drive member and eccentrically disposed crank means carried thereby, means for adjusting the eccentricity of the crank means while the latter is being revolved by rotation of the drive member, a support carried by said drive means, crank mounting means carried by said support and movable radially with respect to the axis of said drive member, an adjusting wheel rotatably mounted on said support eccentrically with respect to said drive member axis for revolution thereabout during drive member rotation, a driving connection between said adjusting wheel and said crank mounting means for radial adjustment of the latter upon rotation of the former, a relatively stationary support and means on said stationary support selectively movable radially toward and away from the drive shaft axis, a pair of spaced wheel engaging members on said radially movable means adapted in intermediate position of the latter to lie at opposite sides of the path of revolution of said wheel, whereby movement of said radially movable means in either direction disposes one of said engaging members in wheel-engaging position to rotate the latter in one direction or the other a predetermined increment as the latter revolves past the engaging member to thereby adjust said crank mounting means radially a corresponding increment, and a second radial adjustment comprising a slide connection between said crank means and said crank mounting means for establishing a preliminary radial adjustment of said crank means while the mechanism is at rest.

References Cited by the Examiner

UNITED STATES PATENTS 2,301,543 11/1942 Hlavaty _____ 74—117
3,090,250 5/1963 Budlong _____ 74—600

FOREIGN PATENTS 49,937 12/1889 Germany.

BROUGTON G. DURHAM, *Primary Examiner.*
WESLEY S. RATLIFF, *Examiner.*